(12) United States Patent
Tuch et al.

(10) Patent No.: US 9,674,174 B2
(45) Date of Patent: *Jun. 6, 2017

(54) CONFIGURATION PROFILE VALIDATION ON IOS USING SSL AND REDIRECT

(71) Applicant: VMware, Inc., Palo Alto, CA (US)

(72) Inventors: Harvey Tuch, Cambridge, MA (US); Mark Zeren, Cambridge, MA (US); Craig F. Newell, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,187

(22) Filed: Jul. 23, 2015

(65) Prior Publication Data

US 2016/0028720 A1 Jan. 28, 2016

Related U.S. Application Data

(63) Continuation of application No. 13/848,347, filed on Mar. 21, 2013, now Pat. No. 9,094,413.

(51) Int. Cl.
*H04L 9/32* (2006.01)
*G06F 21/62* (2013.01)
*G06F 21/33* (2013.01)
*H04L 29/06* (2006.01)

(52) U.S. Cl.
CPC .......... *H04L 63/0823* (2013.01); *G06F 21/33* (2013.01); *G06F 21/6218* (2013.01); *G06F 21/6281* (2013.01); *H04L 9/3265* (2013.01); *H04L 9/3268* (2013.01);

(Continued)

(58) Field of Classification Search
CPC .. G06F 21/6281; G06F 21/6218; G06F 21/33; H04L 63/0823; H04L 9/3268; H04L 9/3263; H04L 63/168; H04L 63/102; H04L 9/3265
See application file for complete search history.

(56) References Cited

U.S. PATENT DOCUMENTS

| | | |
|---|---|---|
| 6,026,235 A | 2/2000 | Shaughnessy |
| 6,212,632 B1 | 4/2001 | Surine et al. |
| 6,405,316 B1 | 6/2002 | Krishnan et al. |

(Continued)

OTHER PUBLICATIONS

Arto Kettula, Security Comparison of Mobile OSes, Helsinki University of Technology (2000).*

(Continued)

*Primary Examiner* — Theodore C Parsons

(57) ABSTRACT

An application management agent running on a wireless communications device restricts access to device functionality (e.g., applications and device features) unless the application management agent has determined that a particular configuration profile has been installed on the device (after which the application management agent permits access to device functionality, and an operating system of the device enforces policy settings specified in the configuration profile). The application management agent confirms the presence of the configuration profile by initiating an SSL handshake with a client certificate request for a client SSL certificate embedded in the configuration profile. Validation against the embedded client SSL certificate implicitly confirms the presence of the configuration profile and validates the content of the configuration profile.

20 Claims, 4 Drawing Sheets

(52) U.S. Cl.
CPC ........ *H04L 63/0272* (2013.01); *H04L 63/102* (2013.01); *H04L 63/168* (2013.01)

(56) References Cited

U.S. PATENT DOCUMENTS

| | | | |
|---|---|---|---|
| 6,463,583 B1 | 10/2002 | Hammond | |
| 6,529,985 B1 | 3/2003 | Deianov et al. | |
| 6,735,774 B1 | 5/2004 | Krishnaswamy | |
| 6,959,441 B2 | 10/2005 | Moore | |
| 7,111,323 B1 | 9/2006 | Bhatia et al. | |
| 7,296,274 B2 | 11/2007 | Cohen et al. | |
| 7,552,446 B1 | 6/2009 | Sosnovsky et al. | |
| 7,565,665 B2 | 7/2009 | Forin et al. | |
| 7,792,546 B2 | 9/2010 | Toy et al. | |
| 7,992,156 B1 | 8/2011 | Wang | |
| 8,233,882 B2 | 7/2012 | Rogel | |
| 8,769,643 B1 | 7/2014 | Ben Ayed | |
| 2003/0126438 A1* | 7/2003 | Wheeler | G06F 21/32 713/168 |
| 2004/0006637 A1 | 1/2004 | Kuacharoen et al. | |
| 2005/0108721 A1 | 5/2005 | Oshima et al. | |
| 2005/0108733 A1 | 5/2005 | Bermudez et al. | |
| 2005/0246705 A1 | 11/2005 | Etelson et al. | |
| 2006/0161973 A1 | 7/2006 | Royer et al. | |
| 2008/0034071 A1 | 2/2008 | Wilkinson et al. | |
| 2008/0250400 A1 | 10/2008 | Vertes | |
| 2008/0282266 A1 | 11/2008 | Kabanov | |
| 2009/0164994 A1 | 6/2009 | Vasilevsky et al. | |
| 2009/0227274 A1* | 9/2009 | Adler | H04L 63/0272 455/466 |
| 2009/0240947 A1 | 9/2009 | Goyal et al. | |
| 2009/0249335 A1 | 10/2009 | Vasilevsky et al. | |
| 2010/0299719 A1* | 11/2010 | Burks | G06F 9/44505 726/3 |
| 2010/0306547 A1 | 12/2010 | Fallows et al. | |
| 2010/0333088 A1 | 12/2010 | Rogel et al. | |
| 2011/0030047 A1 | 2/2011 | Gao et al. | |
| 2011/0219234 A1 | 9/2011 | Bogner | |
| 2011/0252240 A1* | 10/2011 | Freedman | H04L 63/02 713/169 |
| 2011/0276987 A1 | 11/2011 | Pope et al. | |
| 2012/0036552 A1 | 2/2012 | Dare et al. | |
| 2012/0149338 A1 | 6/2012 | Roundtree | |
| 2012/0204126 A1 | 8/2012 | Yoshimura | |
| 2013/0007848 A1 | 1/2013 | Chaskar et al. | |
| 2013/0091543 A1 | 4/2013 | Wade et al. | |
| 2013/0160072 A1 | 6/2013 | Reus et al. | |
| 2013/0167250 A1* | 6/2013 | Balasubramanian | G06F 21/10 726/28 |
| 2013/0239197 A1 | 9/2013 | Kato et al. | |
| 2014/0007048 A1 | 1/2014 | Qureshi et al. | |
| 2014/0007183 A1 | 1/2014 | Qureshi et al. | |
| 2014/0007205 A1 | 1/2014 | Oikonomou | |
| 2014/0032491 A1 | 1/2014 | Neerincx et al. | |
| 2014/0059525 A1 | 2/2014 | Jawa et al. | |
| 2014/0059573 A1 | 2/2014 | Jawa et al. | |
| 2014/0059642 A1 | 2/2014 | Deasy et al. | |
| 2014/0059703 A1 | 2/2014 | Hung et al. | |
| 2014/0282869 A1 | 9/2014 | Dabbiere | |
| 2014/0289511 A1 | 9/2014 | Tuch et al. | |

OTHER PUBLICATIONS

International Search Report and Written Opinion dated Dec. 2, 2013, Application No. PCT/US2013/056675, international filing date of Aug. 26, 2013, 8 pgs.
David Schuetz, "The IOS MDM Protocol," Intrepidus Group, Inc.; Aug. 3, 2011, 29 pgs.
"Over-theAir Profile Delivery Concepts," http://developer.apple.com/library/ios/#documentation/networkinginternet/conceptual/iphoneotaconfiguration/OTASecurity/OTASecurity.html; Feb. 12, 2013, 6 pgs.
"Developer Forums: Retrieving Certificate from Keychain," p. 2, https://devforums.apple.com/thread/3336?start=25&start=0; Mar. 20, 2013, 5 pgs.
"Developer Forums: Retrieving Certificate from Keychain," p. 1, https://devforums.apple.com/message/11142#11142; Mar. 20, 2013, 13 pgs.
"Verify/Check to see if a Configuration Profile has been installed on iPhone," Careers 2.0 by stackoverflow, http://stackoverflow.com/questions/2195673/verify-check-to-see-if-a-configuration-profile-has-been-installed-on-iphone; Mar. 20, 2013, 2 pgs.
Lozzo, Vincenzo, "Let you Mach-O fly", Feb. 18, 2009 42 pages.
Riley et al. "Multi-Aspect Profiling of Kernal Rootkit Behavior" ACM 2009 14 pages.
Sysmagazine, "Redirection of Functions in Mach-O libraries", Sysmagazine, 28 pages Apr. 2011.
Mach-Developer Library—Mach-O Programming Topics, https://developer.apple.com/library/mac/documentation/developertools/conceptual/machotopics/1-articles_indirect_addressing.html, Feb. 2009.
Apple Inc., "OS X ABI Mach-O File Format Reference", 2009, 42 Pages.

* cited by examiner

CONFIGURATION PROFILE VALIDATION ON IOS USING SSL AND REDIRECT

CROSS REFERENCE TO RELATED APPLICATIONS

This application is a continuation of U.S. patent application Ser. No. 13/848,347 filed Mar. 21, 2013, and is related to U.S. Pat. No. 9,087,191, issued Jul. 21, 2015, each of which is incorporated by reference herein.

BACKGROUND

A user owning a personal mobile device (e.g., smartphone, tablet, etc.) may desire to install certain "workplace" mobile applications (e.g., email, calendar, etc.) relating to his work as an employee of a business on his mobile device rather than carry an additional mobile device for work purposes. In situations where an employer permits the user to utilize his personal mobile device to install and run such workspace applications, the employer typically imposes certain security measures or policies on the user's personal device to ensure that enterprise data that is accessed or stored on the personal mobile device is secure.

In order to impose such security measures on personal mobile devices, the employer may utilize a mobile device management (MDM) solution that utilizes an MDM server running on the employer's premises to remotely communicate with a user's mobile device to configure and impose security restrictions. For example, certain mobile operating systems (OSs), such as Apple's iOS on its iPhone and iPad mobile devices, include certain application programming interfaces (APIs) and process flows that enable an MDM server to wirelessly communicate with a mobile device in order to transmit a "configuration profile" to the mobile OS, which, in turn, understands the format of the configuration profile and is thus able to load certain settings and authorization information consistent with the configuration profile. In the case of iOS, a configuration profile may take the form of an XML file that contains a list of settings or properties (sometimes referred to as a .plist file) relating to the employer's security policies, such as restrictions on device features (e.g., camera use, etc.), Wi-Fi settings, VPN settings, email and calendar accounts, authentication credentials and the like. Once an initial configuration profile is established between a mobile device and the MDM server, the MDM server may be able to remotely execute security-related operations on the mobile device such as device lock, device wipe (to erase data on the device), etc. as well as update the configuration profile with new or different security properties.

However, current MDM solutions exert a high level of control on mobile devices, typically, as mentioned above, enabling an employer to remotely lock the user's entire device or erase the entirety of the user's device. As such, employees are increasingly reluctant to relinquish such control of their personal mobile devices to their employer's MDM systems. Alternative less "heavy-handed" approaches that exert control only on the data and applications in a user's personal mobile device that are relevant to the user's employment (e.g., "workspace" data and applications) do exist. For example, the approaches described in U.S. patent application Ser. No. 13/595,881 filed on Aug. 27, 2012 and entitled "Method and System for Facilitating Isolated Workspace for Applications" (which is hereby incorporated by reference and referred to herein as the "'881 Application") utilize a management application locally resident on the mobile device to assist in imposing security policies only around workspace data and applications. Such alternative approaches, however, cannot currently leverage the configuration profile capabilities (i.e., to provide certain security features to a "workspace" environment on the mobile device) supported by mobile OSs such as iOS, since such capabilities are only accessible by conventional MDM servers. In particular, current mobile OSs such as iOS do not provide a mechanism for a local application, (such as the local management application such as described in the '881 Application) to test for or "validate" the presence of a configuration profile that may be downloaded and installed on the mobile OS. Since the local application cannot validate the existence of a configuration profile on the mobile OS, it cannot ensure that certain security settings on a mobile device have been put in place by the loading of a configuration profile by the mobile OS prior to providing access to the workspace environment.

SUMMARY

Particular embodiments of an application installed on a mobile device are configured to permit or deny access to certain resources on the device. The application may receive an https server certificate, a first copy of a client SSL certificate, and a first copy of a root certificate from a policy server. The policy server may have previously transmitted a configuration profile to the mobile device. The configuration profile may specify security-related properties to be implemented by an operating system on the mobile device. The configuration profile may also include (1) a second copy of the client SSL certificate signed by a second copy of the root certificate and (2) the second copy of the root certificate. The https server certificate may have been signed by the first copy of the root certificate.

The application may request the operating system to launch a web browser using a loopback URL. The loopback URL may point to an https server run by the application, wherein the https server certificate is installed on the https server. The mobile device may present, by the web browser, the client SSL certificate to the https server in response to a client certificate request received during an SSL handshake. The application may determine that the first copy of the client SSL certificate matches the second copy of the client SSL certificate.

The operating system may receive a confirmation from the application that the client SSL certificate is trusted if the configuration profile has been installed by the operation system, the SSL handshake was successfully completed, and the first copy of the client SSL certificate matches the second copy of the client SSL certificate, thereby enabling the operating system to verify that the client SSL certificate included in the configuration profile matches the client SSL certificate received from the server. The application may subsequently permit access to the certain resources on the device.

In particular embodiments, the certain resources on the device may include a plurality of business-related applications that are configured to access data managed by an employer of an owner of the mobile device.

In particular embodiments, the security-related properties include VPN settings that enable the business-related applications to securely communicate with servers managed by the employer.

In particular embodiments, the application may determine that the SSL handshake was not successfully completed. At this point the application may request the operating system to redirect the web browser to a URL pointing at the server that had previously transmitted the configuration profile to the mobile device, in order to download a signed copy of the configuration profile for installation, wherein the signed copy was signed by the root certificate.

In particular embodiments, the owner of the mobile device can request a removal of the configuration profile through the application.

In particular embodiments, the configuration profile may be encrypted and signed.

In particular embodiments, the policy server may provision the configuration profile to the device by over-the-air transmission, an email, a URL, or a direct physical connection.

DETAILED DESCRIPTION

Figure 1A:
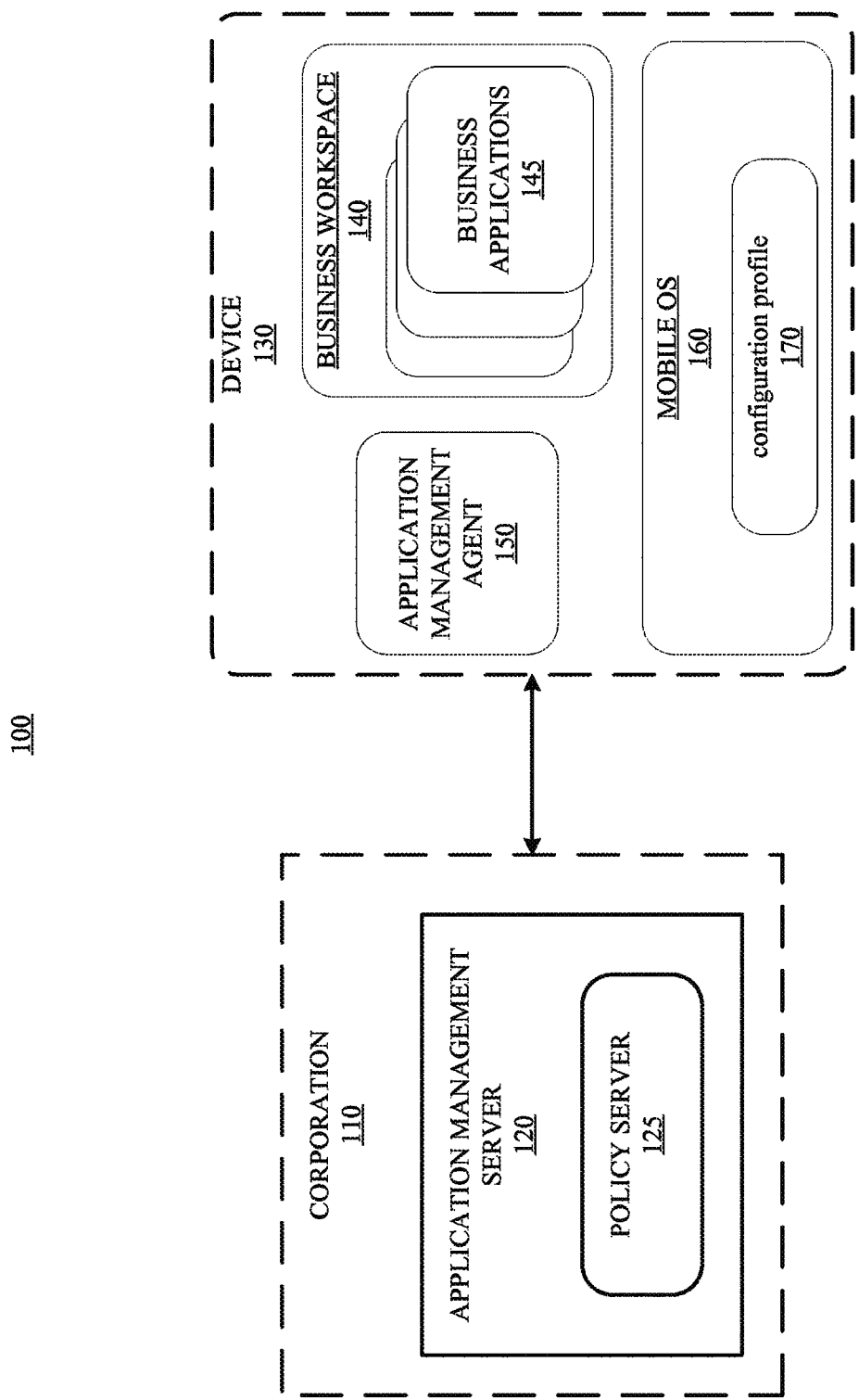
FIG. 1A depicts an example computing environment in which embodiments herein may be practiced.

FIG. 1A depicts an example computing environment 100 in which embodiments described herein may be implemented. A policy server 125 runs within a corporation 110 and manages security policies to enable employees to utilize a business "workspace" 140 consisting, for example, of a number of corporate-approved mobile applications 145 that can be installed on an employee's personal mobile device 130. In the embodiment as depicted in FIG. 1A, policy server 125 is a component or part of an application management server 120 similar to the application management server further described in the '881 Application that runs within corporation 110 with an application management agent 150 that is installed on mobile device 130 in order to manage the use of various applications 145 in business workspace 140 in a secure fashion. Policy server 125 may be configured, for example, to generate, as previously discussed, a configuration profile 170 for mobile device 130 in a format (e.g., XML format in a .plist file in iOS, etc.) that is already supported by a mobile OS 160 of mobile device 130 (e.g., for MDM purposes, etc).

Figure 2:
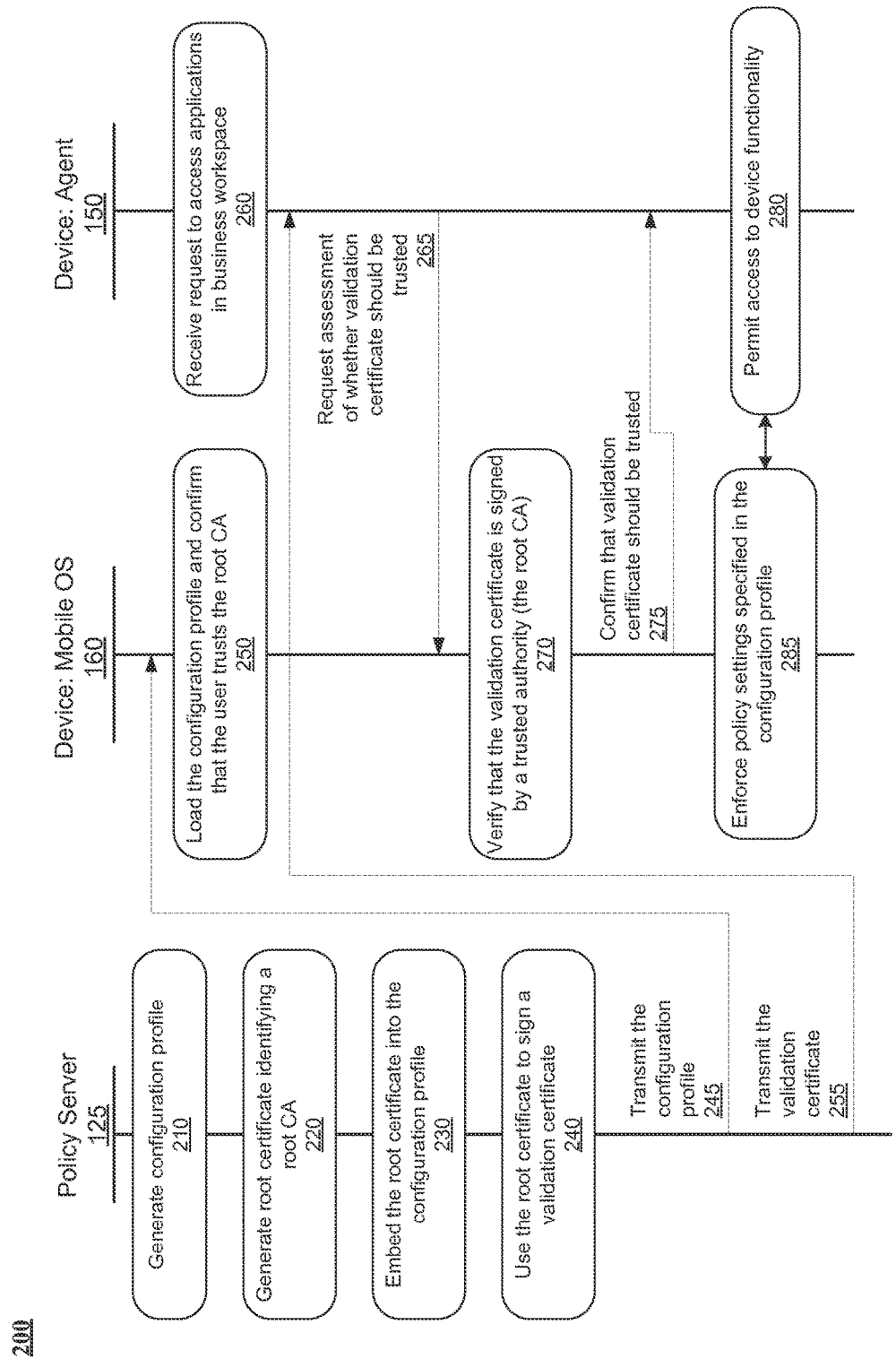
FIG. 2 is an interaction diagram illustrating a workflow for validating a configuration profile using a root CA certificate.

FIG. 2 provides a flow of steps performed by various components in computing environment 100 to enable application management agent 150 to validate the existence of a configuration profile that has been loaded into mobile OS 160 so that application management agent 150 can confirm that certain security measures expressed in the configuration profile have been loaded and implemented by mobile OS 160 prior to allowing an employee to access business workspace 140 on mobile device 130. In step 210, policy server 125 generates a configuration profile 170 for installation on mobile device 130. As previously discussed, configuration profile 170 may be a .plist file in a iOS embodiment and contains a number of security related properties, such restrictions on device features (e.g., camera use, etc.), Wi-Fi settings, VPN settings, email and calendar accounts, authentication credentials and the like that corporation 110 desires to load into mobile device 130 prior to permitting application management agent 150 to provide access to business workspace 140. In step 220, policy server 125 interacts with a root certificate authority (CA) to generate a root certificate (e.g., unique, self-signed certificate in one embodiment) identifying the root CA. Policy server 125 then embeds a copy of the root certificate into configuration profile 170 in step 230. In step 240, policy server 125 then uses the root certificate to sign a second digital certificate (referred to herein as a "validation certificate" for reasons discussed below). In step 245, policy server 125 transmits configuration profile 170 to mobile OS 160 and in step 250, mobile OS 160 loads configuration profile 170, thereby implementing any settings specified therein. Mobile OS 160 also has the user of mobile device 130 confirm that the user trusts the root CA, in order to install the root certificate embedded in configuration profile 170 into mobile OS 160 as a trusted certificate. It should be recognized that there may be a variety of ways to transmit configuration profile 170 to mobile OS 160. In one embodiment, policy server 125 transmits an email or text message (or other out-of-band message) including a URL to access configuration profile 170, which the employee receives and selects on mobile device 130. In such an embodiment, the employee may need to further explicitly agree to accept or otherwise install the root certificate as a trusted certificate recognized by mobile OS 160 (e.g., via pop-up windows on the screen of mobile device 130, etc.). Alternatively, policy server 125 may transmit configuration profile 170 to mobile device 130 through a physical connection such as USB (e.g., which requires physical proximity between mobile device 130 and policy server 125 or a USB storage device that can attach to both mobile device 130 and policy server 125). In step 255, policy server 125 also transmits the validation certificate to application management agent 150. Application management agent 150 is now able to confirm that the validation certificate (which it received directly from policy server 125) is signed by the same root CA that signed the root certificate embedded in the currently-installed configuration profile (thus implying that the configuration profile that was transmitted by policy server 125 was successfully loaded and has not been overwritten or corrupted). In step 260, application management agent 150 receives notification that the employee is attempting to access applications in business workspace 140. In step 265, application management agent 150 requests mobile OS 160 to assess whether the validation certificate should be trusted. Since the validation certificate was signed by the root certificate which was previously loaded into the trusted certificate chain of mobile OS 160 in step 250, in step 270, mobile OS 160 can verify that the validation certificate is signed by a trusted authority (the root CA). In step 275, mobile OS 160 can then confirm to application management agent 150 that the validation certificate is indeed trusted. Confirmation of trust in the validation certificate by mobile OS 160 to application management agent 150 implicitly indicates to application management agent 150 that configuration profile 170 has been successfully installed and therefore the security measures reflected in configuration profile 170 have been implemented by mobile OS 160. As such, application management agent 150, in step 280 can then permit access by the employee to business workspace 140 with the assurance that proper security measures as required by corporation 110 have been implemented and will be enforced by mobile OS 160 (step 285).

In certain embodiments, policy server 125 sets a property within configuration profile 170 to indicate to mobile OS 160 that configuration profile 170 should not be removable from mobile device 130 (e.g., unless the user specifically requests it removal, for example, through application management agent 150). Such an embodiment prevents possible malicious programs from spoofing configuration profile 170 by, for example, accessing the root certificate in the trusted certificate chain of mobile OS 160 in order to embed it in a different malicious configuration profile and request replacement of configuration profile 170. That is, since configuration profile 170 is configured to be non-removable in such an embodiment, its security settings cannot be replaced or removed by such a spoofing technique.

It should be recognized that above scenario of "validating" a validation certificate for application management agent 150 to confirm the presence of configuration profile 170 in mobile OS 160 is merely one example of a situation in which the techniques disclosed herein may be utilized. Other situations may be envisioned in which any other application running on mobile device 132 may desire to confirm the presence of configuration profile 170 prior to permitting access to certain functionality provided, for example, by the application itself or otherwise. Similarly, it should be recognized that in certain embodiments, configuration profile 170 may be additionally encrypted and signed as may be typical when systems such as MDM servers transmit configuration profiles to mobile devices in order to ensure data integrity and verify origin. Similarly, in alternative embodiments, in order to transmit changes to configuration profile 170, policy server 125 may generate a new root certificate to embed into any updates to configuration profile 170 (and accordingly sends a newly signed digital certificate to application management agent 150 to validate). In an alternative embodiment, policy server 125 may embed a new intermediate certificate that is signed by the root certificate into any configuration profile updates transmitted to mobile OS 160, thereby avoiding any requirements of the user to accept additional untrusted new root certificates.

Figure 1B:
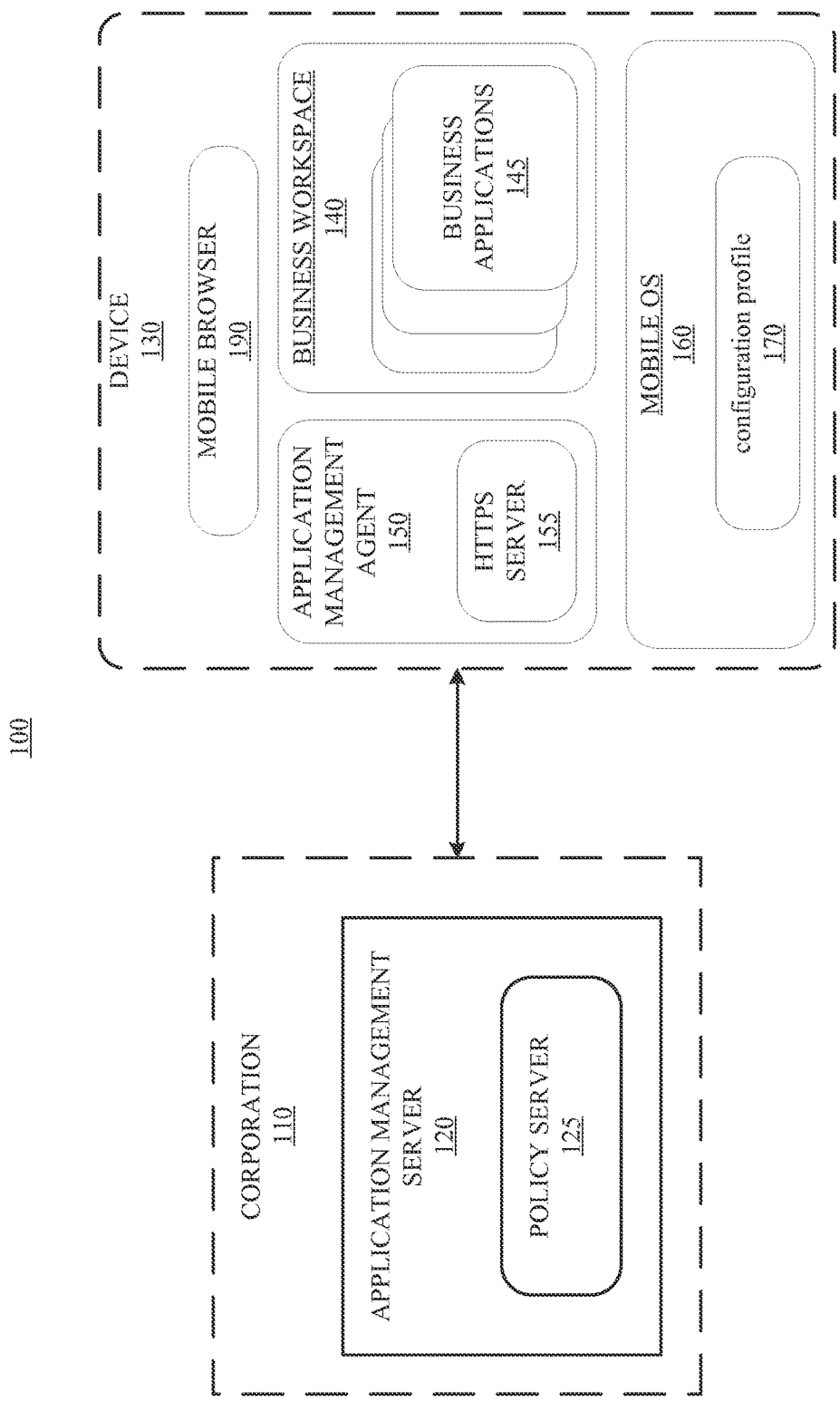
FIG. 1B depicts an alternative computing environment in which embodiments using an https server and a web browser may be practiced.

FIG. 1B depicts an alternative example computing environment 100 in which embodiments described herein may be implemented. Like FIG. 1A, FIG. 1B includes policy server 125 as part of application management server 120 that runs within corporation 110 and manages security policies to enable employees to utilize business workspace 140 consisting of mobile applications 145 on personal mobile device 130. Similarly, application management agent 150 on mobile device 130 manages the use of applications 145 in business workspace 140 in a secure fashion.

However, an embodiment utilizing computing environment 100 of FIG. 1B further utilizes an https server 155 that, for example, is implemented as part of application management agent 150 and a web browser 190 that is installed as an application in mobile OS 160. In particular, as further described below, embodiments utilizing components of FIG. 1B may leverage the pre-existing capability of web browser 190 to support and engage in certain security protocols typically used to establish secure encrypted sessions between web browser 190 and web servers (such as, for example https server 155), such as Secure Sockets Layer (SSL), Transport Security Layer (TLS) or other similar types of security protocols (hereinafter, generally referred to as "SSL"). In one embodiment, for example, https server 155 may be implemented using open source packages such as OpenSSL.

Figure 3:
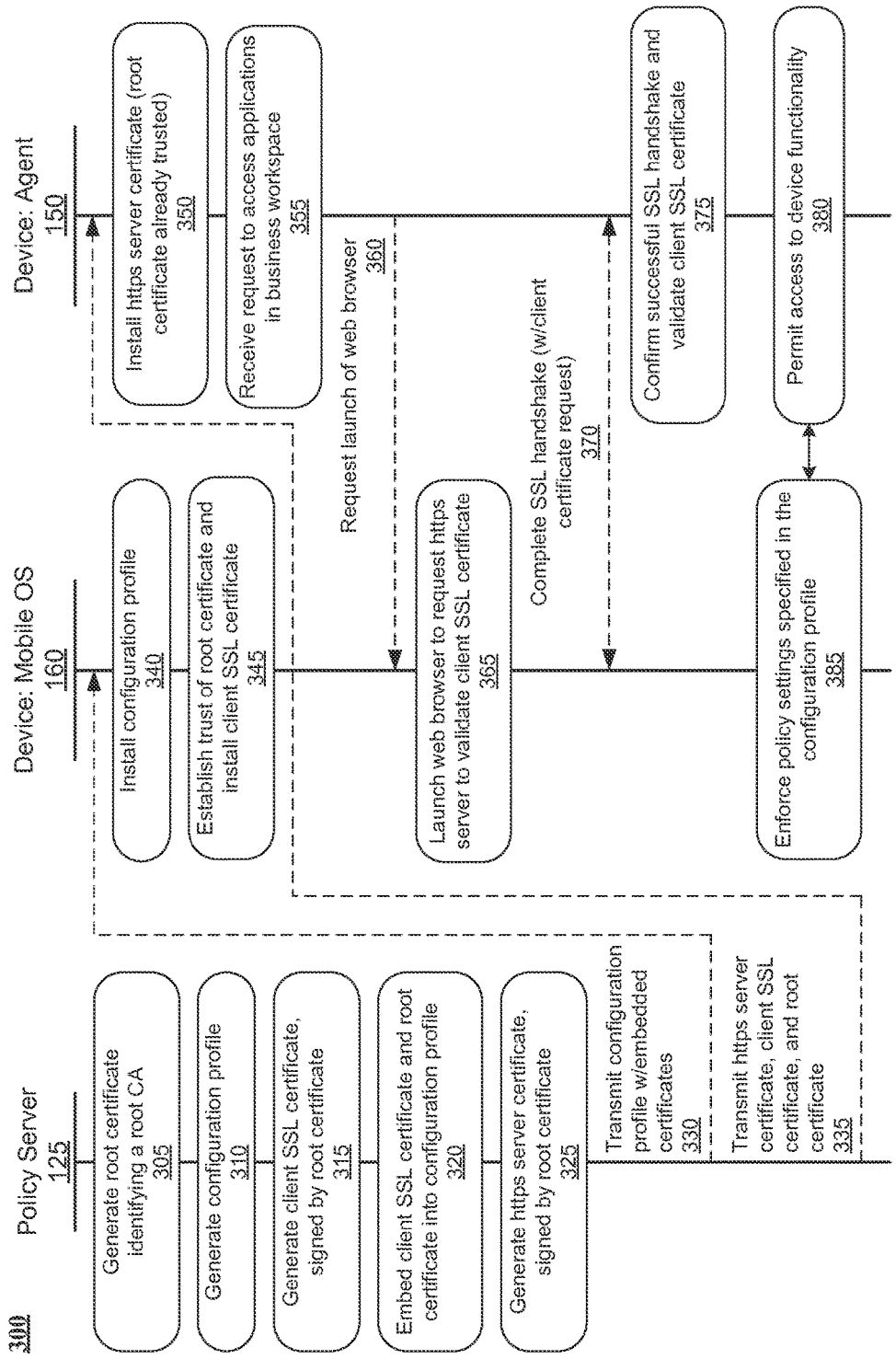
FIG. 3 is an interaction diagram illustrating a workflow for validating a configuration profile using a client SSL certificate.

FIG. 3 provides a flow of steps to validate the existence of a configuration profile in mobile OS 160 using https server 155 and web browser 190 of FIG. 1B. In one such embodiment, as in FIG. 2, policy server 125 generates a root certificate identifying a root CA in step 305. Policy server 125 then generates configuration profile 170 in step 310 to provide certain security measures to mobile OS 160. In step 315, policy server 125 generates a client SSL certificate/key pair and signs the client SSL certificate with the root certificate. In step 320, policy server 125 embeds a copy of the signed client SSL certificate and a copy of the root certificate into configuration profile 170. In step 325, policy server 125 also generates an https server certificate/key pair, where the https server certificate is likewise signed by the root certificate. Policy server 125 then transmits configuration profile 170 with the embedded certificates to mobile OS 160 in step 330, and transmits the https server certificate, a copy of the client SSL certificate, and a copy of the root certificate to application management agent 150 in step 335. In step 340, mobile OS 160 loads the received configuration profile 170, thereby implementing any settings specified therein. In step 345, mobile OS 160 has the user of mobile device 130 confirm that the user trusts the root CA, in order to install the root certificate and the signed client SSL certificate embedded in configuration profile 170 into mobile OS 160. In step 350, application management agent 150 adds the https server certificate signed by the root certificate to its chain of certificates for later use by https server 155. Once the client SSL certificate is installed into mobile OS 160 and the https server certificate is installed onto https server 155, web browser 190 can retrieve and use the client SSL certificate during an SSL "handshaking" communication session with https server 155 to exchange encryption keys to use during a secure communications session. The SSL handshake may be configured to restrict the set of accepted certificate authorities to the root CA identified in the root certificate.

When application management agent 150 receives notification that the employee is attempting to access business workspace 140 in step 355 and desires to confirm that configuration profile 170 has been installed in mobile OS 160, application management agent 150, in step 360, requests mobile OS 160 to launch web browser 190 to initiate communication with https server 155, for example, by providing web browser 190 an https "loopback" URL to mobile device 130 where https server 155 is listening for connections. When mobile OS 160 launches web browser 190 using the loopback URL in step 365, mobile OS 160 thereby initiates an SSL-based protocol interaction between web browser 190 and https server 155. As part of completing the SSL handshake in step 370, https server 155 sends a client certificate request to web browser 190, and web browser 190 presents the client SSL certificate installed on mobile OS 160 (and signed by the root certificate) to https server 155. In step 375, application management agent 150 confirms that the SSL handshake was successful, and then validates the client SSL certificate presented by web browser 190, thereby implicitly confirming the presence of configuration profile 170 in mobile OS 160 (since the client SSL certificate was provided to mobile OS 160 as an embedded portion of configuration profile 170). In particular embodiments, application management agent 150 may validate the authenticity of the client SSL certificate presented by web browser 190 by comparing it to the copy of the client SSL certificate previously received in step 335. In step 380, application management agent 150 is able to permit access to business workspace 140, while mobile OS 160 enforces the policy settings specified in configuration profile 170 (step 385). It should be recognized that in certain environment where mobile OS 160 treats SSL certificates as secrets (e.g., in contrast to allowing applications to discover the root certificate described in discussions relating to FIG. 3A), utilizing SSL certificates as opposed to root certificates to confirm the presence of configuration profile 170 further minimizes the opportunities for malicious applications to spoof configuration profile 170, as previously discussed above.

Particular embodiments provide device 130 with an opportunity to install configuration profile 170 should the SSL handshake fail. Policy server 125 retains a copy of configuration profile 170 with the embedded client SSL certificate, signs it with the root certificate, and makes signed configuration profile 170 available at a URL for download and installation. At the time when the SSL handshake fails, mobile OS 160 initiates a redirect using web browser 190 to the URL pointing to a location on policy server 125 where signed configuration profile 170 is available. The user will then be prompted to install configuration profile 170, at which point the process can be restarted at step 380 using the loopback URL.

Although one or more embodiments of the present invention have been described in some detail for clarity of understanding, it will be apparent that certain changes and modifications may be made within the scope of the claims. For example, policy server 125 may use other techniques to securely provision configuration profile 170 or the validation certificate to a device 130, such as, by way of example and not limitation: over-the-air (OTA), email, URL, or by using a configuration utility such as iPCU. In another example, in order to prevent tampering with or removal of configuration profile 170, policy server 125 may sign configuration profile 170 with a private key assigned to a particular entity (e.g., the employer or a particular policy server 125); in this case, device 130 will only allow configuration profile 170 to be overwritten or updated by a new configuration profile if it is signed with the same key. In another example, where multiple client SSL certificates are present, the https server 155 may specify the applicable certificate authority in order to narrow down the acceptable certificate authorities to the one root CA that was used to sign the client SSL certificate and the https server certificate. In another example, the https server certificate may be signed by another root CA than that which was used to sign the client SSL certificate; in this case, the user may have to separately confirm that the other root CA is also trusted. For example, at the time when the https server certificate is installed, the user may be asked to confirm that the other root CA is also trusted. In another example, instead of providing the entire client certificate, policy server 125 may provide a pre-computed hash of the client SSL certificate to application management agent 150, which can then validate the client SSL certificate in step 375 by computing a hash of the copy of the client SSL certificate obtained from web browser 190 and comparing it with the pre-computed hash received from policy server 125. In another example, rather than comparing copies of the client SSL certificate or computing a hash, application management agent 150 may simply deem the client SSL certificate presented by web browser 190 valid by verifying that there is a chain of trust from the client SSL certificate to a trusted root CA (i.e., the client SSL certificate is directly signed by a trusted root CA or by an intermediate CA, wherein the trust anchor for the intermediate CA is trusted)—in this example, the root certificate may not need to be embedded in the configuration profile together with the client SSL certificate (if the mobile OS has already established trust of the root CA).

It should be recognized that use of certain terminology that may be more commonly used with certain operating systems than others is merely exemplary not meant to limit the scope of the teachings herein to any particular operating system and that corresponding functions and components in other operating system platforms may benefit from the teachings herein.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Disc)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims. The scope of this disclosure encompasses all changes, substitutions, variations, alterations, and modifications to the example embodiments described or illustrated herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. A method to confirm that a configuration profile has been installed on a mobile device, comprising:
   receiving, by an application installed on the mobile device and configured to permit or deny access to certain resources on the device, an https server certificate, a first copy of a client SSL certificate, and a first copy of a root certificate from a server that has previously transmitted a configuration profile to the mobile device;
   requesting the operating system to launch a web browser using a loopback URL, wherein the loopback URL points to an https server run by the application, wherein the https server certificate is installed on the https server;
   presenting, by the web browser, the client SSL certificate to the https server in response to a client certificate request received during an SSL handshake;
   determining, by the application, that the first copy of the client SSL certificate matches a second copy of the client SSL certificate specified by the configuration profile;
   receiving a confirmation from the application that the client SSL certificate is trusted if the configuration profile has been installed by the operation system, the SSL handshake was successfully completed, and the first copy of the client SSL certificate matches the second copy of the client SSL certificate; and
   permitting, by the application, access to the certain resources on the device.

2. The method of claim 1, wherein the certain resources on the device include a plurality of business-related applications that are configured to access data managed by an employer of an owner of the mobile device.

3. The method of claim 2, wherein the configuration profile specifies security-related properties that include VPN settings that enable the business-related applications to securely communicate with servers managed by the employer.

4. The method of claim 1, further comprising:
   determining that the SSL handshake was not successfully completed;
   requesting the operating system to redirect the web browser to a URL pointing at the server that had previously transmitted the configuration profile to the mobile device; and
   downloading a signed copy of the configuration profile for installation, wherein the signed copy was signed by the root certificate.

5. The method of claim 4, further comprising:
   receiving a request for removal of the configuration profile through the application.

6. The method of claim 1, wherein the configuration profile is encrypted and signed.

7. The method of claim 1, further comprising:
   provisioning the configuration profile to the device by over-the-air transmission, an email, a URL, or a direct physical connection.

8. A non-transitory computer readable medium comprising instructions, which when executed in a computer system, causes the computer system to carry out a method to confirm that a configuration profile has been installed on a mobile device, comprising:
   receiving, by an application installed on the mobile device and configured to permit or deny access to certain resources on the device, an https server certificate, a first copy of a client SSL certificate, and a first copy of a root certificate from a server that has previously transmitted a configuration profile to the mobile device;
   requesting the operating system to launch a web browser using a loopback URL, wherein the loopback URL points to an https server run by the application, wherein the https server certificate is installed on the https server;
   presenting, by the web browser, the client SSL certificate to the https server in response to a client certificate request received during an SSL handshake;
   determining, by the application, that the first copy of the client SSL certificate matches a second copy of the client SSL certificate specified by the configuration profile;
   receiving a confirmation from the application that the client SSL certificate is trusted if the configuration profile has been installed by the operation system, the SSL handshake was successfully completed, and the first copy of the client SSL certificate matches the second copy of the client SSL certificate; and
   permitting, by the application, access to the certain resources on the device.

9. The non-transitory computer readable medium of claim 8, wherein the certain resources on the device include a plurality of business-related applications that are configured to access data managed by an employer of an owner of the mobile device.

10. The non-transitory computer readable medium of claim 9, wherein the configuration profile specifies security-related properties that include VPN settings that enable the business-related applications to securely communicate with servers managed by the employer.

11. The non-transitory computer readable medium of claim 8, further comprising:
    determining that the SSL handshake was not successfully completed;
    requesting the operating system to redirect the web browser to a URL pointing at the server that had previously transmitted the configuration profile to the mobile device; and downloading a signed copy of the configuration profile for installation, wherein the signed copy was signed by the root certificate.

12. The non-transitory computer readable medium of claim 11, further comprising:
receiving a request for removal of the configuration profile through the application.

13. The non-transitory computer readable medium of claim 8, wherein the configuration profile is encrypted and signed.

14. The non-transitory computer readable medium of claim 8, further comprising:
provisioning the configuration profile to the device by over-the-air transmission, an email, a URL, or a direct physical connection.

15. A mobile device, comprising:
a local storage; and
a processor configured to execute instructions stored in the local storage to:
receive, by an application installed on the mobile device and configured to permit or deny access to certain resources on the device, an https server certificate, a first copy of a client SSL certificate, and a first copy of a root certificate from a server that has previously transmitted a configuration profile to the mobile device;
request the operating system to launch a web browser using a loop back URL, wherein the loopback URL points to an https server run by the application, wherein the https server certificate is installed on the https server;
present, by the web browser, the client SSL certificate to the https server in response to a client certificate request received during an SSL handshake;
determine, by the application, that the first copy of the client SSL certificate matches a second copy of the client SSL certificate specified by the configuration profile;
receive a confirmation from the application that the client SSL certificate is trusted if the configuration profile has been installed by the operation system, the SSL handshake was successfully completed, and the first copy of the client SSL certificate matches the second copy of the client SSL certificate; and
permit, by the application, access to the certain resources on the device.

16. The mobile device of claim 15, wherein the certain resources on the device include a plurality of business-related applications that are configured to access data managed by an employer of an owner of the mobile device.

17. The mobile device of claim 16, wherein the configuration profile specifies security related properties that include VPN settings that enable the business-related applications to securely communicate with servers managed by the employer.

18. The mobile device of claim 15, wherein the processor is further configured to:
determine that the SSL handshake was not successfully completed;
request the operating system to redirect the web browser to a URL pointing at the server that had previously transmitted the configuration profile to the mobile device; and
download a signed copy of the configuration profile for installation, wherein the signed copy was signed by the root certificate.

19. The mobile device of claim 18, wherein the processor is further configured to receive a request for removal of the configuration profile through the application.

20. The mobile device of claim 15, wherein the configuration profile is encrypted and signed.

* * * * *